United States Patent [19]

Ashrawi et al.

[11] Patent Number: 4,559,148

[45] Date of Patent: Dec. 17, 1985

[54] METHOD OF EXTRACTING AND REUTILIZING SURFACTANTS FROM EMULSIONS

[75] Inventors: Samir S. Ashrawi; Gabriel Prukop, both of Houston, Tex.

[73] Assignee: Texaco Inc., White Plains, N.Y.

[21] Appl. No.: 685,574

[22] Filed: Dec. 24, 1984

[51] Int. Cl.$^4$ .................. E21B 43/22; E21B 43/40
[52] U.S. Cl. .................. 252/8.55 D; 166/266; 208/188
[58] Field of Search .......... 252/8.55 D; 166/266, 166/267; 208/188

[56] References Cited

U.S. PATENT DOCUMENTS

| | | | |
|---|---|---|---|
| 3,637,521 | 1/1972 | Tsuk .................. | 252/326 |
| 3,687,845 | 8/1972 | Treat et al. .......... | 210/54 |
| 4,029,570 | 6/1977 | Coffman et al. ...... | 208/188 |
| 4,073,344 | 2/1978 | Hall .................. | 166/307 |
| 4,216,079 | 8/1980 | Newcombe ............ | 208/188 |
| 4,261,812 | 4/1981 | Newcombe ............ | 208/188 |
| 4,277,352 | 7/1981 | Allison et al. ....... | 252/8.55 |
| 4,370,238 | 1/1983 | Tackett .............. | 208/188 X |
| 4,516,635 | 5/1985 | Maddox ............... | 166/266 |

*Primary Examiner*—Herbert B. Guynn
*Attorney, Agent, or Firm*—Jack H. Park; Kenneth R. Priem; Harold J. Delhommer

[57] ABSTRACT

The invention extracts surfactants from produced emulsions of oil, water and surfactants from enhanced oil recovery operations and concentrates the surfactants into an aqueous solution. The produced emulsion is mixed with an alkali metal chloride salt, and butanol or pentanol, and allowed to separate into two phases, an oleic phase and an aqueous phase. The oleic phase is then mixed with fresh water containing about 1% to about 10% by weight of isopropanol, ethanol or methanol, and the mixture is allowed to separate into at least two phases, a substantially water-free and surfactant-free crude oil phase and an aqueous phase containing virtually all of the enhanced oil recovery surfactants originally within the produced emulsion. The surfactants in the aqueous phase may be reutilized for further enhanced oil recovery operations.

7 Claims, 2 Drawing Figures

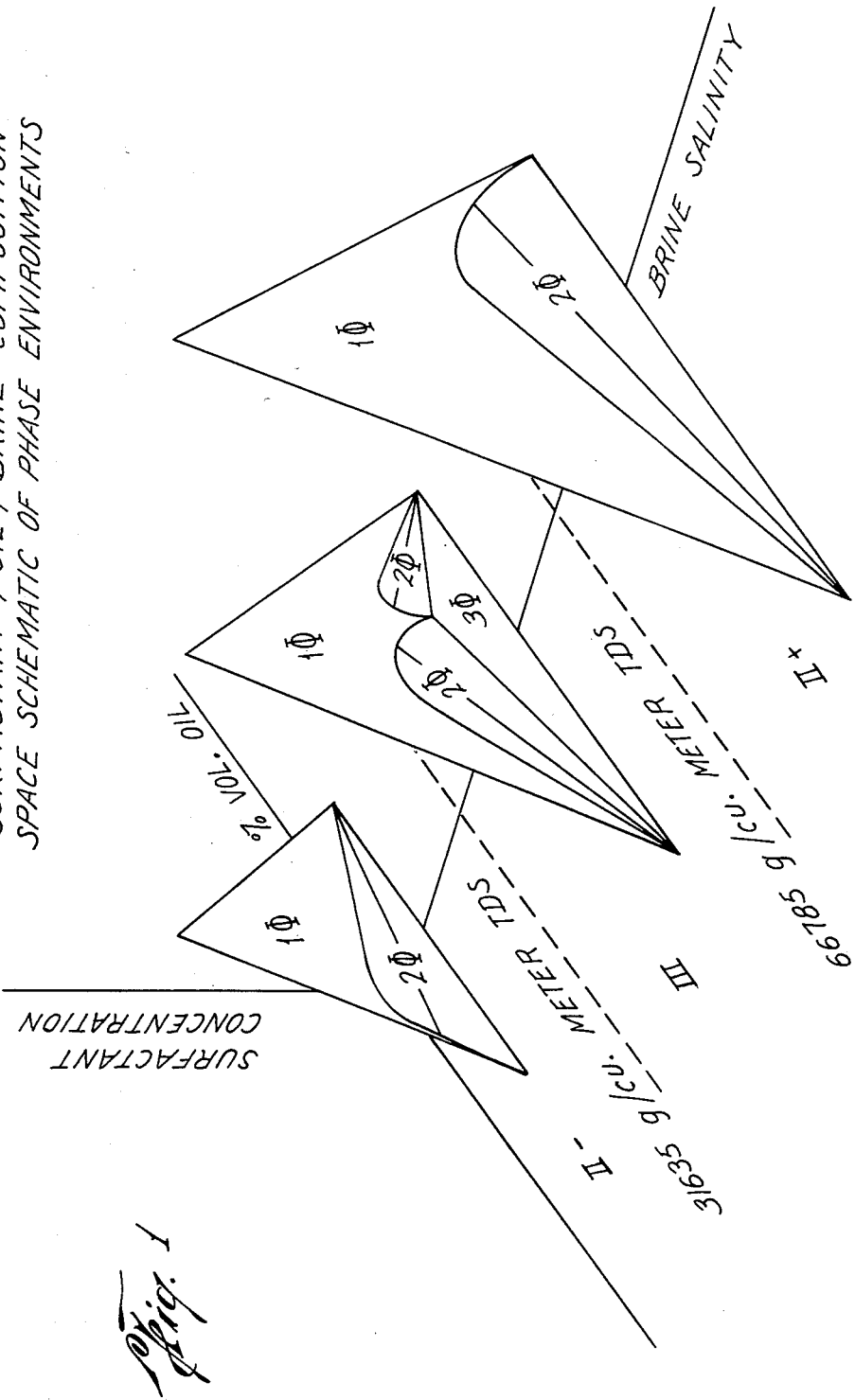

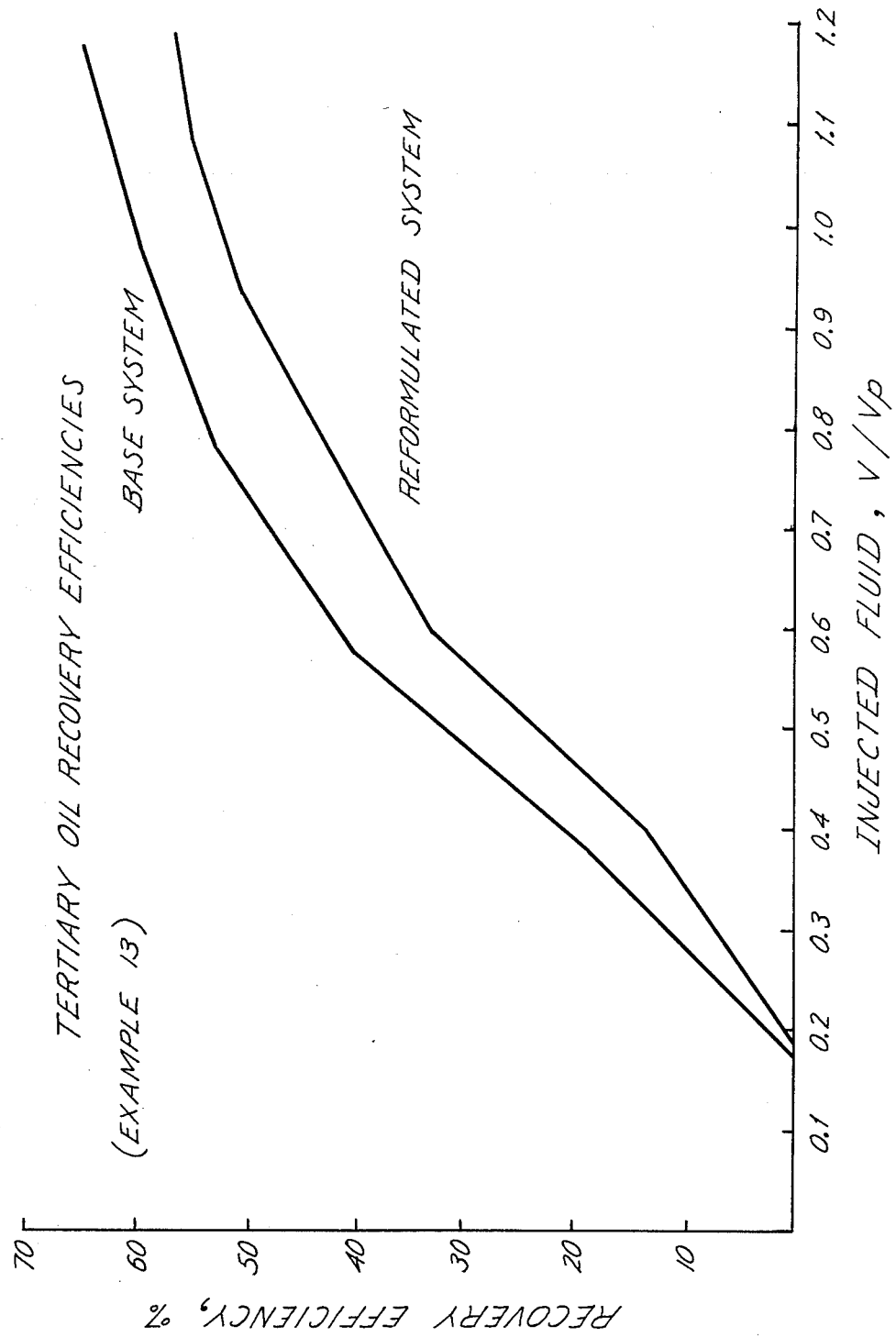

METHOD OF EXTRACTING AND REUTILIZING SURFACTANTS FROM EMULSIONS

BACKGROUND OF THE INVENTION

This invention relates to the extraction and reutilization of surfactants from oil, water and chemical emulsions that are produced as a result of enhanced oil recovery operations.

Surfactant flooding has become one of the more promising enhanced oil recovery techniques for recovering oil after water flooding. Generally, the method of surfactant flooding employs the injection of a surfactant in an aqueous solution or in an emulsion to sweep through the formation and recover oil. This may be followed by a polymer solution for mobility control and improved sweep efficiency. It is believed that surfactants are effective because of their ability to reduce the interfacial tension between crude oil and water. This reduction of interfacial tension permits the creation of various oil, water and surfactant emulsions in the formation. Thus, the produced liquids of surfactant flooding generally contain very stable oil, water and surfactant emulsions.

Because of the relative amounts of oil and water produced in chemical flooding, the produced emulsions will usually be oil-in-water emulsions. Upon settling, especially in the early stages of a chemical flood, such emulsions may change to the water-in-oil emulsions which are usually encountered in primary petroleum production. Conventional surfactant extraction and emulsion breaking techniques which work on water-in-oil emulsions may be ineffective with oil-in-water emulsions.

Considerable quantities of surfactants may be entrained in the produced emulsions. This prevents the effective reutilization of the produced surfactant in the continuing surfactant flooding process. Because surfactants are expensive additives for chemical floods, commercial economics require that surfactant costs be minimized by reutilizing a substantial quantity of surfactant that is injected into the formation. The methods which are available to separate the produced emulsions fail to extract and concentrate the produced surfactant sufficiently for reutilization of the surfactant.

One method of breaking an oil-in-water emulsion is described in U.S. Pat. No. 4,029,570 where additional formation brine is added to the produced emulsion to produce an oil phase and a water phase. However, such brine addition treatments will in many cases not work on produced fluids. One reason is the tendency of formation rock to selectively adsorb high equivalent weight sulfonates, leaving lower equivalent weight sulfonates behind, rendering the surfactant highly hydrophilic. Such processes will not sufficiently extract and concentrate the surfactant to allow reutilization. The surfactant is often left highly diluted in a relatively large volume of oil-in-water emulsion unsuitable for reutilization.

U.S. Pat. No. 3,637,521 discloses an emulsion breaking process comprising the steps of (1) adding an acid to lower the pH of the emulsion to approximately 5.0 and (2) adding an alkylamine containing 1 to 5 nitrogen atoms and from 2 to 12 carbon atoms. U.S. Pat. No. 3,687,845 describes a process wherein oil-in-water emulsions are treated by the addition of a high molecular weight, water-soluble polymer such as the polyvinyl aromatics of benzene such as polystyrene, polyvinyl toluene and several acrylamide compounds.

Another method which has been tried to break oil-in-water emulsions is the use of additional surface active agents. U.S. Pat. No. 4,261,812 discloses a method which employs an additional surface active agent having an average equivalent weight higher than the equivalent weight of the surface active agents in the produced emulsion, preferably an equivalent weight of about 400 to 600. U.S. Pat. No. 4,073,344 mentions the use of dimethylbenzene ammonium chloride, trimethyl ammonium chloride and alkyl benzene sulfonates for the same purpose. The use of additional solubilizers to break oil-in-water emulsions was promoted by U.S. Pat. No. 4,277,352 which suggests adding materials commonly used as solubilizers in surfactant flooding to the produced emulsion.

A different approach to breaking emulsions and recovering surfactant is disclosed in U.S. Pat. No. 4,216,079. This method employs the addition of brine and a low molecular weight alcohol having one to five carbon atoms, preferably isopropyl alcohol, to break the emulsion into three phases with the majority of the surfactant being partitioned into a middle phase. A chief drawback to this particular method is that the conditions necessary to form the three phase region can be difficult to identify, and those conditions may change rapidly because of the varying concentrations of components of the produced emulsions. Substantially greater experimentation is required to fine tune the method of U.S. Pat. No. 4,216,079 to be in the three phase region than for an emulsion breaking method which breaks the emulsion into two phases.

SUMMARY OF THE INVENTION

The present invention is a method for extracting surfactants from produced emulsions of oil, water and surfactants from enhanced oil recovery operations and concentrating the surfactants into an aqueous solution. The produced emulsion is mixed with an alkali metal chloride salt or possibly with water containing an alkali metal chloride salt and butanol or pentanol, and allowed to separate into two phases, an oleic phase and an aqueous phase. The oleic phase is then mixed with fresh water containing about 1% to about 10% by weight of isopropanol, ethanol or methanol and the mixture is allowed to separate into at least two phases, a substantially water-free and surfactant-free crude oil phase and an aqueous phase containing virtually all of the enhanced oil recovery surfactants originally within the produced emulsion.

The recovered enhanced oil recovery surfactants may be reutilized in the aqueous solution "as is", further concentrated by methods well known in the art or recycled in the aqueous solution after the addition of supplemental surfactants and solubilizers. The best oil recovery efficiency is obtained when the second aqueous phase containing the surfactants originally within the produced emulsion is supplemented with additional surfactants and solubilizers to replace the particular chemical components that were lost within the underground formation.

BRIEF DESCRIPTION OF THE DRAWINGS

FIG. 1 is a schematic illustration of the phase environments of the surfactant/oil/brine systems employed in Examples 2-12.

FIG. 2 illustrates the oil recovery efficiencies per volume injected in two core floods comparing the base surfactant system with the reformulated surfactant system.

DETAILED DESCRIPTION

The extraction of surfactants from produced emulsions according to the present invention solves a difficult problem and permits the reutilization of the relatively expensive surfactants employed in enhanced oil recovery flooding. An additional advantage is provided by the recovery of crude oil which is substantially free of entrained surfactant and water impurities. The invention comprises extracting surfactants from produced water and oil emulsions by the addition to the emulsion of about 3 grams to about 40 grams of butanol or pentanol per liter of emulsion and about 10 grams to about 150 grams of an alkali metal chloride salt preferably about 10 grams to about 100 grams of sodium chloride per liter of emulsion. Secondary butanol and sodium chloride are the additives most preferred. The mixture is then allowed to settle and separate into at least two phases, an oleic phase and an aqueous phase.

After separation into two phases, the oleic phase is mixed with fresh water containing about 1% to about 10% by weight of isopropanol, ethanol or methanol and allowed to settle into at least two phases, a second oleic phase and a second aqueous phase which contains substantially all of the enhanced oil recovery surfactants originally present within the produced emulsion. Isopropanol is the most preferred alcohol for use in the second extraction step. It is important to use fresh water and not a brine in the second extraction step. The volume of fresh water added is preferably about equal to or less than the volume of the first aqueous phase.

During an appropriate settling time of about 30 to about 60 minutes, which may be considerably shorter or longer depending on conditions, most of the surfactants will partition into the oleic phase in the first extraction. In the second extraction step performed on the oleic phase, substantially all of the enhanced oil recovery surfactants will partition into the second aqueous phase along with a minor amount of oil. The oleic phase left behind after the second extraction is almost completely free of any surfactant or brine contamination.

It should be noted that liquids may not settle into separate distinct phases all of the time. At times, there may be a small boundary area between two phases which does not distinctly belong to either phase. Sometimes a complete separation into the phases may take days. Thus, whenever the words "separate" and "separation" are used herein, they refer to a separation that is preponderantly complete.

The surface active agents extracted may be the commonly used anionic surfactants such as petroleum sulfonates or nonionic surfactants. More specifically, the inventive method extracts surfactants such as alkylaryl sulfonates, alkoxylated alkylphenol sulfonates, alkoxylated alkylphenol sulfates, and alkoxylated sulfonated or sulfated alcohols.

Other materials which may be present in the produced emulsions are various thickening agents such as biopolymers and synthetic polymers, e.g., polysaccharides and polyacrylamides. Salts which occur naturally in the formation or were added to the flooding water may be present. Additionally, the invention process is also effective in extracting surfactants from emulsions which contain various solubilizers, usually added to enhance surfactant solubility. The solubilizers include the water soluble alcohols, polyhydric alcohols, ether alcohols, alkoxylated phenols and alkoxylated alkylphenols, alkoxylated alcohols, polyalkoxylated mercaptans, as well as sulfated or sulfonated derivatives of the alkoxylated phenols or the alkoxylated alcohols.

Produced emulsions will normally be in the form of oil-in-water emulsions and water-in-oil emulsions. Many times, an oil-in-water emulsion will separate over time with the aid of gravity to a water-in-oil emulsion and an aqueous phase. Oil soluble sulfonate surfactants usually speed up this process.

Certain pretreatment steps may be optionally employed to improve the extraction and concentration of the surfactants. Separation by gravity of the produced emulsion in the predominantly oily and aqueous phases will reduce the volume of produced oil emulsion to be treated by the extraction method. Likewise, the employment of a heater treater or similar apparatus to process the produced emulsion prior to the extraction method will also substantially reduce the volume of the emulsion to be treated as well as improve the efficiency of the extraction method. Third, the addition of oil soluble, high equivalent weight surfactants to the produced emulsion may also significantly aid gravity separation in reducing oily emulsion volume. Sulfonate surfactants which tend to be oil soluble and have an average equivalent weight within the range of about 400 to about 600 are especially preferred for pretreatment of the produced emulsions.

The concentration of the extraction compounds employed varies considerably with the different compounds added as well as the composition of the produced emulsion. Secondary butanol, the preferred extracting compound for the first extraction, is employed in amounts ranging from about 3 grams to about 40 grams per liter of emulsion treated, most preferably in the amount of about 3 grams to about 10 grams of butanol per liter of emulsion.

Secondary butanol is a very good destabilizing agent for most produced emulsions. If pentanol is employed instead of secondary butyl alcohol, it is desirable to add less salt to the emulsion than that which is added when the butanol compounds are added to the emulsion. Pentanol has a greater tendency than the butanol compounds to shift the phase environment boundaries of the system to lower salinities. Therefore, if pentanol is used as an emulsion destabilizing agent, less alkali metal chloride salts will be needed. A disadvantage to employing pentanol is that pentanol takes more water into the first oleic phase. This is not as desirable from a treating cost basis. The alcohol n-butanol also has a greater tendency than secondary butanol to shift the phase environment boundaries of the system, but the destabilization characteristics of n-butanol are not as great as secondary butanol.

The lighter alcohols of methanol, ethanol and propanol effect a displacement of the phase environment boundaries to higher salinities, i.e., they increase the optimal salinity. The heavier alcohols of pentanol, hexanol or greater affect a displacement to lower salinities in the system phase environment boundaries. They decrease optimal salinity. Butanols have a minimal lowering effect on optimal salinity but are strong emulsion destabilizing agents.

The second extraction employs about 1% to about 10% by weight of isopropanol, ethanol or methanol in fresh water. Isopropanol is the preferred extracting compound for the second extraction step. The use of fresh water is important in order to change the salt concentration and aid the isopropanol in affecting the proper shift to the two phase region. Ethanol and methanol have greater tendencies to shift the phase environment boundaries to higher salinities. Consequently, less ethanol and methanol should be used than isopropanol in the second extraction step.

The lowest effective concentration of extracting compound required also varies substantially with the concentration of surfactants in the produced emulsion, the treating temperature, the salinity of the produced emulsion, and the types and concentrations of solubilizers and surfactants in the produced emulsion. For example, a higher concentration of extracting compound is required as surfactant concentration in the produced emulsion increases (generally with increasing emulsion stability) and as the extraction temperature increases. Higher brine salinities and increased divalent ion concentrations require less extracting compound concentrations.

The surfactant extraction is most effectively carried out at a temperature of about 20° C. to about 70° C. Ideally, the produced emulsion and the extracting compound solution is preheated to extraction temperature prior to mixing. But it should be noted that extractions can be successful with certain produced emulsions even at ambient temperatures.

The extraction method may be practiced in either a batch or continuous manner. Most of the first extracting compound is partitioned into the oil-free aqueous phase. Thus, the first aqueous phase may be recycled and used to treat additional produced emulsion. But since some of the butanol or pentanol will be lost, additional first extracting compound must be added to the used aqueous phase before it is employed again for additional extractions. Likewise, make-up salt may also be required.

For continuous surfactant extraction, it is suggested that an apparatus similar to the widely used, vertical type heater treater or similar to the apparatus disclosed in U.S. Pat. Nos. 2,354,856 and 2,753,046 be employed. The suggested apparatus consists of one or more vertical cylindrical vessels having perforated plates or ample space throughout the vessels to minimize turbulence in the treating vessels.

The second aqueous phase resulting from the second extraction and containing a high concentration of surfactants may be directly injected into the formation as a surfactant slug in an enhanced oil recovery flood, thus, reutilizing the originally injected surfactants. The use of the second aqueous phase of the present extraction invention as a surfactant slug in chemical flooding can produce a substantial savings in the quantities of relatively expensive surfactants that are employed for such flooding, significantly improving the economics of surfactant flooding.

The second aqueous phase may be injected "as is" or in conjunction with other materials as a supplement or a substitute for the original surfactant flooding slug. Recovery efficiencies with the "as is" second aqueous phases will often substantially approach the recovery efficiencies of the originally injected surfactant flood. When the second aqueous phase is supplemented with additional solubilizers or surfactants, total recovery efficiency can substantially duplicate the recovery efficiencies of the original flooding compositions.

The following examples further illustrate the novel surfactant extraction and reutilization method of the present invention. These examples are given by way of illustration and not as limitations in the scope of the invention. Thus, it should be understood that the steps and materials employed in the instant method may be varied to achieve similar results within the scope of the invention.

EXAMPLE 1

The invention method was first tested upon a produced emulsion sample obtained from a well in a Southern Illinois formation which had been subjected to a surfactant flood. In Example 1, the field produced emulsion had a salinity of approximately 70,300 g/m$^3$ TDS and contained approximately 10 meq/1 of sulfonate surfactants, TRS-18, TRS-40 and LN-60COS. TRS-18 is a trademarked oil-soluble sulfonate surfactant sold by Witco Chemical Company having an average equivalent weight of about 500. TRS-40 is a trademarked water-soluble sulfonate sold by Witco Chemical Company having an average equivalent weight of about 300. LN-60COS is a trademarked sulfated derivative of an ethoxylated alcohol having about 12 to 14 carbon atoms sold by Texaco Chemical Company having an average equivalent weight of about 550.

This produced emulsion was initially treated with 100 g of NaCl per liter and 30 g of secondary butanol per liter of sample. Approximately 99.8% of the surfactants contained within the produced emulsion partitioned to the oleic phase. As with all of the examples, the surfactant concentration in the oleic and aqueous phases was determined by two-phase titration.

EXAMPLES 2–12

For Examples 2–12, emulsions were created in the laboratory to model the produced emulsion of Example 1. Three parts of oil by volume from the Southern Illinois field was vigorously mixed with seven parts by volume of different surfactant solutions containing the appropriate proportions of the same three surfactants, 36% TRS-18, 36% TRS-40 and 28% LN-60COS, at overall surfactant concentrations of 5%, 0.5%, 0.05% and 0.005%, in different brines. When 0.005% surfactant solution was employed, laboratory instruments were unable to measure the amount of surfactant in either the oleic or aqueous phases. The brines had salinities ranging from about 70,300 g/m$^3$ TDS to about 18,100 g/m$^3$ TDS. The total volume of each sample was 45 ml. Certain properties of each example emulsion as well as the results of the treating method are listed in Table 1.

The phase behavior of the surfactant/oil/brine system described in Examples 2–12 was determined experimentally by equilibrating sealed-tube samples of varying compositions. The experimentally determined phase behavior is schematized in FIG. 1 into the three-phase environment described by Winsor (A. P. Winsor, "Solvent Properties of Amphiphillic Compounds", Butterworth's Scientific Publication, London 1954). The nomenclature of the environment types is that of Nelson and Pope (R. C. Nelson and G. A. Pope, Soc. Pet. Eng. J., Oct. 1978, p. 325–338).

The boundaries between these environment types along the brine salinity axis are also shown in FIG. 1 for the system described in Examples 2–12. At salinities below about 32,000 g/m$^3$ total dissolved solids (TDS), the system exists in a II−type environment. In the two-phase (2Φ) region of this environment, a microemulsion is in equilibrium with excess oil. At salinities above about 67,000 g/m³ TDS, the system exists in a II+ type environment. In the two-phase (2Φ) region of this environment, a microemulsion is in equilibrium with excess brine.

Between the type II− and II+ environments lies the type III phase environment. This environment has two two-phase (2Φ) regions and a three-phase (3Φ) region where a microemulsion exists in equilibrium with excess oil and brine. The three-phase environment types have a single-phase (1Φ) region. Optimal salinities exist within the type III phase environment at a point where the volumes of oil and brine within the microemulsion are about equal. Shifts in phase environment boundaries and optimal salinity can be affected by changes in the composition of the system which include, but are not limited to variables such as salinity, hardness, alcohol type and content, solubilizer type and content, and surfactant structure and equivalent weight.

All example fluids were treated with 100 g of sodium chloride per liter and either 0.003, 0.01 or 0.03 g/ml of secondary butanol. Several tests were also run with pentanol, which proved almost as effective as the secondary butanol.

After mixing with the salt and secondary butanol, the emulsion samples were allowed to stand. The samples broke into two distinct phases, generally in about 10 to 20 minutes. The lower aqueous phase was usually hazy and slightly yellowish in color, especially in samples with 5% and 0.5% surfactant. The yellowish haze disappeared after a few hours at room temperature. No "rag" emulsion layers were observed at the interface. It has been noted that increased temperature speeds separation. Phase swelling was observed in all examples. The phases were separated by extracting the top oleic phase with a syringe equipped with a 16 gauge needle. The separate phases were then analyzed.

The brine aqueous phase was analyzed for surfactant and secondary butanol by two-phase titration and gas chromatography, respectively. The oleic phase was analyzed for surfactant and water by a pentane extraction/2-phase titration and the Karl-Fischer method, respectively.

Relative emulsion stabilities were measured by the time it took a fixed volume of lower aqueous phase to visibly clear. These measurements indicated that increasing the amount of added secondary butanol significantly reduced the produced emulsion stability. This is a considerable advantage which must be balanced against the extra cost of added secondary butanol. Samples which contained a lesser amount of surfactant needed less secondary butanol to break up and separate the emulsion. Increasing the salinity of the emulsion decreased the emulsion stability. Thus, the greater the salinity the produced emulsion, the less salt or secondary butanol needs to be added.

EXAMPLE 13

The laboratory modeled emulsion of Example 2 was treated according to Example 2 for Example 13. Example 13 started with a 300 ml volume of produced emulsion to which was added 30 g of sodium chloride and 9 g of secondary butanol. As in Example 2, approximately 99.98% of the titratable surfactant was isolated in the top oleic phase.

The oleic and brine phases were separated. To the oleic phase, a 5% solution of isopropanol containing 200 ml of deionized water and 10 ml of isopropanol were added. The sample was shaken in a separatory funnel and allowed to stand at 26° C. for 24 hours. It was then observed that the intended separation was not complete. After standing for four more days, the oleic and aqueous phases were separated. The surfactant concentration in the aqueous phase was about 105 meq/liter by two-phase titration. This was 83% of the titratable surfactant concentration in the original surfactant solution prior to oil contact and treatment. The salinity of the second aqueous phase was estimated to be 7,040 g/m³ TDS, which resulted from the isopropanol and fresh water dilution of the brine which was transferred into the oleic phase upon the NaCl/secondary butanol treatment. The oil content of the second aqueous phase was estimated to be about 10% from phase volume considerations.

Two linear 2-foot core floods were carried out. The cores were saturated with Southern Illinois crude oil. Each core was then waterflooded with connate water having 70,000 g/m³ TDS. The first core flood employed the basic surfactant slug formulation identified in Example 2 and the second core flood employed the second aqueous phase produced in Example 13 as a surfactant slug. The surfactant slug was followed by a polymer slug of 250 ppm Rhodopol, a trademarked polysaccharide sold by Rhone Poulenc. The core flood characteristics are listed in Table 2. The recovery efficiencies of both the base system and the reformulated system of Example 13 are illustrated in FIG. 2.

Recovery efficiency for the base surfactant system was about 65% compared to a recovery efficiency of about 57% for the surfactant slug based upon the second aqueous phase of Example 13. The reformulated surfactant system provided excellent recovery considering its reduced surfactant concentration and lower brine salinity. Better recovery efficiencies can certainly be obtained by employing additional surfactant and solubilizer in the second aqueous phase before reutilizing the second aqueous phase as a surfactant slug in an enhanced oil recovery flood.

Many other variations and modifications may be made in the concepts described above by those skilled in the art without departing from the concepts of the present invention. Accordingly, it should be clearly understood that the concepts disclosed in the description are illustrative only and are not intended as limitations on the scope of the invention.

TABLE I

| Example | Brine Salinity (g/m³ TDS) | Surfactant Conc. (meq/l) | SBA* Added (g/ml) | Surfactant Concentration (meq/l)** | | Phase Volume (ml) | | Water Concentration in Top Phase+ (g/m³) |
|---|---|---|---|---|---|---|---|---|
| | | | | Top Phase | Bottom Phase | Top | Bottom | |
| 1 | 70,300 | 10 | 0.03 | 34.04 | 0.034 | 32.5 | 72.5 | 19,700 |
| 2 | 70,300 | 118 | 0.03 | 181 | 0.017 | 17.3 | 30.9 | 76,800 |
| 3 | 70,300 | 11.8 | 0.003 | 20 | ND++ | 14.6 | 32.6 | 17,600 |
| 4 | 70,300 | 11.8 | 0.01 | 19 | ND | 14.9 | 32.8 | 14,700 |

TABLE I-continued

| Example | Brine Salinity (g/m³ TDS) | Surfactant Conc. (meq/l) | SBA* Added (g/ml) | Surfactant Concentration (meq/l)** | | Phase Volume (ml) | | Water Concentration in Top Phase+ (g/m³) |
| --- | --- | --- | --- | --- | --- | --- | --- | --- |
| | | | | Top Phase | Bottom Phase | Top | Bottom | |
| 5 | 70,300 | 11.8 | 0.03 | 18 | ND | 15.6 | 33.2 | 12,400 |
| 6 | 70,300 | 1.18 | 0.003 | 2.0 | ND | 14.0 | 33.0 | 17,400 |
| 7 | 70,300 | 1.18 | 0.03 | 1.3 | ND | 15.1 | 33.8 | 4,270 |
| 8 | 22,850 | 11.8 | 0.003 | 11 | ND | 14.3 | 32.7 | 18,400 |
| 9 | 22,850 | 11.8 | 0.01 | 21 | ND | 15.0 | 32.9 | 14,100 |
| 10 | 22,850 | 11.8 | 0.03 | 20 | ND | 15.6 | 33.3 | 13,000 |
| 11 | 18,100 | 1.18 | 0.003 | 0.41 | ND | 14.6 | 32.8 | 5,200 |
| 12 | 18,100 | 1.18 | 0.03 | 1.4 | ND | 15.3 | 33.6 | 3,800 |

*Secondary butanol
**By two-phase titration
+Water-in-oil by Karl-Fischer method
++Not detected

TABLE 2
CORE FLOOD PARAMETERS

| | | |
| --- | --- | --- |
| Core Characteristics | | |
| | Dimensions | 1.59 × 1.91 × 62 cm |
| | Pore Volume | 33.1 ml |
| | Porosity | 0.176 |
| | Permeability to Water | 100 md |
| Surfactant Solution | | |
| Type | Base System: | 36% TRS-18; 36% TRS-40; 28% LN-60COS |
| | Reformulated System: | See text of Example 13 |
| Concentration | Base System: | 5% wt in 70,300 g/m³ TDS brine |
| | Reformulated System: | 104 meq/l in 7040 g/m³ TDS brine |
| Viscosity ($\eta$) | Base System: | 27 cP @ 10 sec$^{-1}$; room temperature |
| | Reformulated System: | 3.1 cP @ 10 sec$^{-1}$; room temperature |
| Interfacial Tension | Base System: | 0.45 mdyn/cm; room temperature |
| | Reformulated System: | 0.41 mdyn/cm; room temperature |
| Slug Size | Base System: | 0.175 $V_p$ |
| | Reformulated System: | 0.187 $V_p$ |
| Flow Rate | | 5 ft/day |
| Polymer Drive | | |
| | Type | Rhodopol |
| | Concentration | 250 ppm in deionized water |
| | Viscosity ($\eta$) | 8.3 cP @ 10 sec$^{-1}$; room temperature |
| | Slug Size | 1.0 $V_p$ |
| | Flow Rate | 5 ft/day |

What is claimed is:

1. A method for extracting enhanced oil recovery surfactants from produced emulsions comprising oil, water and surfactant, which comprises:

mixing a produced emulsion with about 3 grams to about 40 grams of butanol or pentanol per liter of emulsion and about 10 grams to about 150 grams of an alkali metal chloride salt per liter of emulsion;

allowing the mixture of produced emulsion, salt and butanol or pentanol to separate into two phases, an oleic phase and an aqueous phase;

mixing the oleic phase with fresh water containing about 1% to about 10% by weight of isopropanol, ethanol or methanol; and allowing the mixture of oleic phase, fresh water and isopropanol, ethanol or methanol to separate into two phases, an oleic phase and a second aqueous phase containing substantially all of the enhanced oil recovery surfactants originally within the produced emulsion.

2. The method of claim 1, wherein the produced emulsion is processed through a heater treater to reduce the volume of emulsion to be mixed with the solution of salt and butanol or pentanol.

3. The method of claim 1, wherein the fresh water containing isopropanol, ethanol or methanol is added to the oleic phase in a volume approximately equal to the aqueous phase previously separated from the produced emulsion.

4. A method for extracting enhanced oil recovery surfactants from produced emulsion comprising oil, water and surfactant, which comprises:

allowing the produced emulsion to settle into two phases, an emulsion phase and an aqueous phase;

mixing the emulsion phase with about 3 grams to about 40 grams of butanol or pentanol per liter of emulsion and about 10 grams to about 150 grams of an alkali metal chloride salt per liter of emulsion;

allowing the mixture of emulsion phase, salt and butanol or pentanol to separate into two phases, an oleic phase and an aqueous phase;

mixing the oleic phase with fresh water containing about 1% to about 10% by weight of isopropanol, ethanol or methanol; and allowing the mixture of oleic phase, fresh water and isopropanol, ethanol or methonal to separate into two phases, an oleic phase and an aqueous phase containing substantially all of the enhanced oil recovery surfactants orginally within the produced emulsion.

5. A method for extracting enhanced oil recovery surfactants from produced emulsions comprising oil, water and surfactants, which comprises:

mixing a produced emulsion with water containing about 3 to about 10 grams of secondary butanol per liter of emulsion and about 10 to about 100 grams of sodium chloride per liter of emulsion;

allowing the mixture of produced emulsion, sodium chloride and secondary butanol to separate into two phases, an oleic phase and an aqueous phase;

mixing the oleic phase with fresh water containing about 2% to about 4% by weight of isopropanol, said fresh water being added in a volume approximately equal to the aqueous phase previously separated from the produced emulsion; and allowing the mixture of oleic phase, fresh water and isopropanol to separate into two phases, an oleic phase and a second aqueous phase containing substantially all of the enhanced oil recovery surfactants originally within the produced emulsion.

6. A method for reutilizing surfactants in enhanced oil recovery flood that are entrained within a produced emulsion comprising oil, water and surfactant, which comprises:

allowing the produced emulsion to settle into two phases, an emulsion phase and an aqeuous phase;

mixing the emulsion phase with water containing about 3 grams to about 40 grams of butanol or pentanol per liter of emulsion and about 10 grams to about 150 grams of an alkali metal chloride salt per liter of emulsion;

allowing the mixture of emulsion phase, salt and butanol or pentanol to separate into two phases, an oleic phase and an aqueous phase;

mixing the oleic phase with fresh water containing about 1% to about 10% by weight of iospropanol, ethanol or methanol;

allowing the mixture of oleic phase, fresh water and isopropanol, ethanol or methanol to separate into two phases, an oleic phase and a second aqueous phase containing substantially all of the enhanced oil recovery surfactants originally within the produced emulsion; and injecting the second aqueous phase as a surfactant slug in an enhanced oil recovery flood.

7. The method of claim 6 for reutilizing surfactants, further comprising the addition of surfactant and solubilizer to the second aqueous phase prior to injecting the second aqueous phase as a surfactant slug.

* * * * *